(12) United States Patent
Kato

(10) Patent No.: US 6,825,870 B2
(45) Date of Patent: Nov. 30, 2004

(54) SCANNING OPTICAL APPARATUS WITH REDUCED WAVE ABERRATION

(75) Inventor: Manabu Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/364,523

(22) Filed: Feb. 12, 2003

(65) Prior Publication Data

US 2003/0169327 A1 Sep. 11, 2003

(30) Foreign Application Priority Data

Feb. 15, 2002 (JP) ........................................ 2002-038292

(51) Int. Cl.[7] .............................................. B41J 27/00
(52) U.S. Cl. ..................................... 347/258; 347/244
(58) Field of Search .............................. 347/242, 243, 347/244, 256, 258, 259, 260, 261

(56) References Cited

U.S. PATENT DOCUMENTS 5,881,346 A * 3/1999 Mori et al. .................. 399/301
6,081,386 A * 6/2000 Hayashi et al. ............. 369/641

* cited by examiner

Primary Examiner—Hai Pham
(74) Attorney, Agent, or Firm—Fitzpatrick, Cella, Harper & Scinto

(57) ABSTRACT

A scanning optical apparatus includes a first optical element for converting a state of light beam emitted from a light source into another state, a second optical element for converting the light beam from the first optical element into a line image elongated in a main scanning direction, a deflecting element for deflecting and scanning the light beam from the second optical element, and a scanning optical element for forming an image of the light beam deflected by the deflecting element on a surface to be scanned with a spot-like shape. A deflecting surface of the deflecting element and the surface to be scanned are nearly conjugate in a sub scanning cross section. The position where the wave aberration in the sub scanning cross section of the light beam on an optical axis in the deflected light beam becomes least is located on the side of the deflecting element with respect to the surface to be scanned.

11 Claims, 14 Drawing Sheets

SCANNING OPTICAL APPARATUS WITH REDUCED WAVE ABERRATION

BACKGROUND OF THE INVENTION

1. Field of the Invention

The present invention relates in general to a scanning optical apparatus and an image forming apparatus using the same. In particular, the present invention is suitable for an image forming apparatus, such as a laser beam printer, a digital copying machine or a multi-function printer having an electrophotographic process, which is adapted to deflect light beam emitted from a light source by a deflecting element to scan optically a surface to be scanned through a scanning optical element having the fθ characteristics thereby to record image information.

2. Related Background Art

Heretofore, in a scanning optical apparatus such as a laser beam printer, a light beam which has been optically modulated in accordance with an image signal to be emitted from the light source are periodically deflected by an optical deflector including a rotating polygon mirror for example to be converged on a surface of a photosensitive recording medium (photosensitive drum) in a spot-like shape by a scanning optical element having the fθ characteristics and then the surface of the recording medium is optically scanned with the deflected luminous fluxes to carry out the image recording.

FIG. 16 is a perspective view schematically showing construction of a main portion of a conventional scanning optical apparatus. In the figure, diverged light beam emitted from a light source 91 are made substantially the parallel light beam or converged light beam by a collimator lens 92, and then the luminous fluxes (quantity of light) are shaped by an aperture stop 93 to be inputted into a cylindrical lens 94 which has a refracting power only in a sub scanning direction. The luminous flux entered into the cylindrical lens 94 is emitted within a main scanning cross section in its entirety, while it is converged within the sub scanning cross section to be imaged substantially in the form of a line image in the vicinity of a polygon mirror surface 95a of an optical deflector 95 constituted by a rotating polygon mirror.

Then, the light beam which has been reflected and deflected by the polygon mirror surface 95a of the optical deflector 95 are introduced onto a photosensitive drum surface as a surface 98 to be scanned through an fθ lens system (scanning optical element) 96 having the fθ characteristics. Then, the photosensitive drum surface 98 is scanned in a direction (main scanning direction) indicated by an arrow B with the deflected light beam by rotating the optical deflector 95 in a direction indicated by an arrow A to thereby record the image information.

In such a scanning optical apparatus, for the optical correction of the surface tilt of an optical deflector within the sub scanning cross section, it is necessary to establish an optical conjugate relationship (imaging relationship) between the vicinity of the deflecting surface of the optical deflector and the surface to be scanned.

FIG. 17 is a cross sectional view of a main portion in the sub scanning direction from the deflecting surface to the surface to be scanned. In the case where the deflecting surface 95a and the surface 98 to be scanned have perfectly the conjugate relationship in such a manner, under the condition in which the spherical aberration of the scanning optical element 96 is less and also a quantity of surface tilt of the deflecting surface is less, as indicated by dotted lines, the light beam deflected by the deflecting surface 95a having the surface tilt is necessarily returned back onto an optical axis and hence has no displacement in the sub scanning direction on the surface 98 to be scanned.

However, in the optical deflector such as a polygon mirror in which the deflecting surface is apart from the rotational center as shown in FIG. 18, the deflecting surface is moved back and forth depending on the deflected field angle for deflection. Thus, if the light beam within the sub scanning cross section is wanted to be imaged on the surface to be scanned in the whole field angle, then it is difficult to perfectly establish the conjugate relationship between the deflecting surface 95a and the surface 98 to be scanned in the whole field angle. By the way, in the figure, the same constituent elements as those shown in FIG. 16 are designated with the same reference numerals. Then, reference numeral 71 designates a line image obtained through the cylindrical lens 94, reference numeral 81 designates a polygon mirror surface for deflecting the light beam on the optical axis, reference numeral 82 designates a polygon mirror surface for deflecting the outermost off-axis light beam on the side opposite to the light source side, and reference numeral 83 designates a polygon mirror surface for deflecting the outermost off-axis light beam on the light source side.

Thus, since the conjugate relationship is perfectly established in the image height at which the line image 71 obtained through the cylindrical lens 94 coincides with the deflecting surface, the irradiation position shift due to the surface tilt is not caused. However, the variation in the irradiation position due to the surface tilt is large in the vicinity of the optical axis and in the vicinity of the optical path most outside the optical axis in each of which the distance from the line image 71 to the deflecting surface is long. This variation in the irradiation position due to the surface tilt causes nonuniformity in pitch in the sub scanning direction with the cycle of the number of polygon mirror surfaces and hence becomes a problem in terms of recording image information with high accuracy.

On the other hand, in recent years, a multi-beam scanning optical apparatus for scanning simultaneously a surface with a plurality of light beams emitted from a multi-beam light source has been proposed in order to cope with the high speed and the high definition. However, since in this apparatus, a certain quantity of pitch error originally remains among a plurality of light beams, there is encountered a problem in that the irradiation position shift due to the surface tile largely influences an image.

Furthermore, there has been proposed a color image forming apparatus in which four photosensitive bodies (photosensitive drums) are used for the high speed operation of a color copying machine, and scanning optical apparatuses are arranged therein, respectively, to form latent images using laser beams thereby to form images of a manuscript having Y(yellow), M(Magenta), C(cyanogen), and Bk(black), respectively, on the surfaces of the corresponding photosensitive bodies. However, in this apparatus, there is encountered a problem in that the number of lines of used mesh dot patterns and the screen angles are variegated, and thus in a part of the patterns, the irradiation position shift due to the above-mentioned surface tilt appears in the form of a Moiré pattern in an image to degrade remarkably the image quality.

SUMMARY OF THE INVENTION

In the light of the foregoing, the present invention has been made in order to solve the above-mentioned problems associated with the prior art, and it is, therefore, an object of the present invention to provide a scanning optical apparatus and an image forming apparatus using the same adapted to image recording of high quality which are capable of improving the function of correcting the surface tilt while meeting the curvature of field within a sub scanning cross section by utilizing an easy and simple method, and of suppressing the irradiation position shift due to the surface tilt of a deflecting surface of a deflector to the less degree.

According to one aspect of the invention, a scanning optical apparatus includes: a first optical element for converting a state of light beam emitted from light source means into another state; a second optical element for converting the light beam from the first optical element into a line image elongated in a main scanning direction; a deflecting element for deflecting and scanning the light beam from the second optical element; and a scanning optical element for forming an image of the light beam deflected by the deflecting element on a surface to be scanned with a spot-like shape, a deflecting surface of the deflecting element and the surface to be scanned being nearly conjugate in a sub scanning cross section, and in the scanning optical apparatus, a position where a wave aberration in the sub scanning cross section of the light beam on an optical axis in the deflected light beam becomes least is located on the side of the deflecting element with respect to the surface to be scanned.

In further aspect of the scanning optical apparatus, the position where the wave aberration in the sub scanning cross section of the outermost off-axis light beam on the light source means side in the deflected light beam becomes least is located on the side opposite to the deflecting element side with respect to the surface to be scanned.

According to another aspect of the invention, a scanning optical apparatus includes: a first optical element for converting a state of light beam emitted from light source means into another state; a second optical element for converting the light beam from the first optical element into a line image elongated in a main scanning direction; a deflecting element for deflecting and scanning the light beam from the second optical element; and a scanning optical element for forming an image of the light beam deflected by the deflecting element on a surface to be scanned with a spot-like shape, a deflecting surface of the deflecting element and the surface to be scanned being nearly conjugate in a sub scanning cross section, and in the scanning optical apparatus, the position where the wave aberration in the sub scanning cross section of the outermost off-axis light beam on the light means side in the deflected light beam becomes least is located on a side opposite to the deflecting element side with respect to the surface to be scanned.

In further aspect of the scanning optical apparatus, when the lateral magnification in the sub scanning cross section of the scanning optical element is $\beta s$, the following condition is met:

$$1 \leq |\beta s| \leq 3.5.$$

In further aspect of the scanning optical apparatus, when s distance from the surface to be scanned to the position where the wave aberration in the sub scanning cross section of the light beam on the optical axis becomes least is dS0, the distance from the deflection point of the light beam on the optical axis to the image formation position in the sub scanning cross section of the second optical element is HS0, and the lateral magnification in the sub scanning cross section of the scanning optical element is $\beta s$, the following condition is met:

$$HS0 \times \beta s^2 \leq dS0 < 0.1 HS0 \times \beta s^2.$$

In further aspect of the scanning optical apparatus, the light source means has a single light emitting point.

In further aspect of the scanning optical apparatus, the light source means has a plurality of light emitting points.

In further aspect of the scanning optical apparatus, the scanning optical element includes a single optical element or a plurality of optical elements.

According to another aspect of the invention, an image forming apparatus includes: the scanning optical apparatus as described in the above-mentioned aspects of the invention; a photosensitive member arranged on the surface to be scanned; a developing unit for developing an electrostatic latent image formed on the photosensitive member with the light beam used for the scanning by the scanning optical apparatus in the form of a toner image; a transfer unit for transferring the toner image obtained through the developing to a material to which an image is to be transferred; and a fixing unit for fixing the transferred toner image to the material to which an image is to be transferred.

According to another aspect of the invention, an image forming apparatus includes: the scanning optical apparatus as described in the above-mentioned aspects of the invention; and a printer controller for converting code data inputted from an external device into image signals to input the resultant image signals to the scanning optical apparatus.

According to another aspect of the invention, an image forming apparatus includes: a plurality of scanning optical apparatuses each including the scanning optical apparatus as described in the above-mentioned aspects of the invention; and a plurality of image carriers arranged on the surfaces to be scanned of the scanning optical apparatuses, respectively, for forming images having respective colors different from one another.

In further aspect of the image forming apparatus, the apparatus further includes a printer controller for converting color signals inputted from an external device into image data having different colors to input the resultant image data to the scanning optical apparatuses, respectively.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

<Scanning Optical Apparatus>

(First Embodiment)

Figure 1:
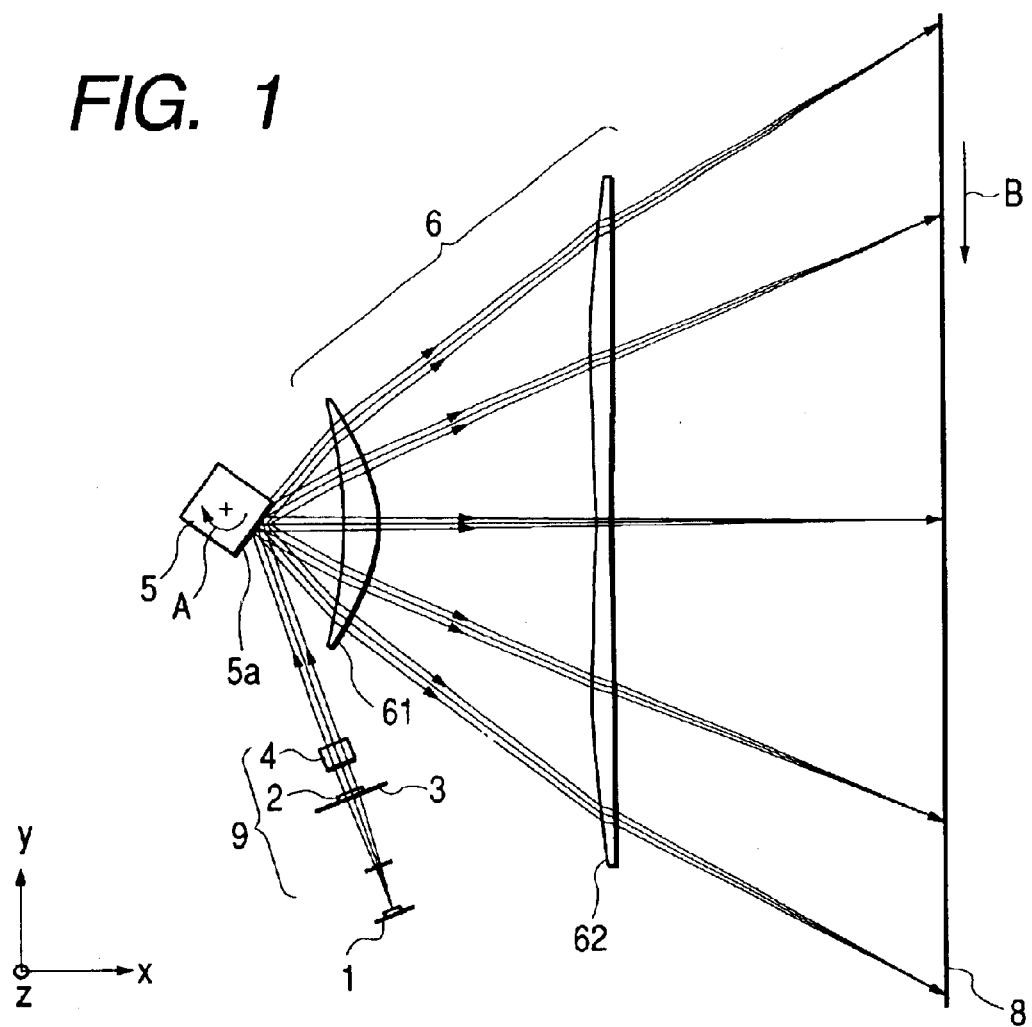
FIG. 1 is a cross sectional view showing construction of a main portion in a main scanning direction according to a first embodiment of the present invention.
Figure 2:
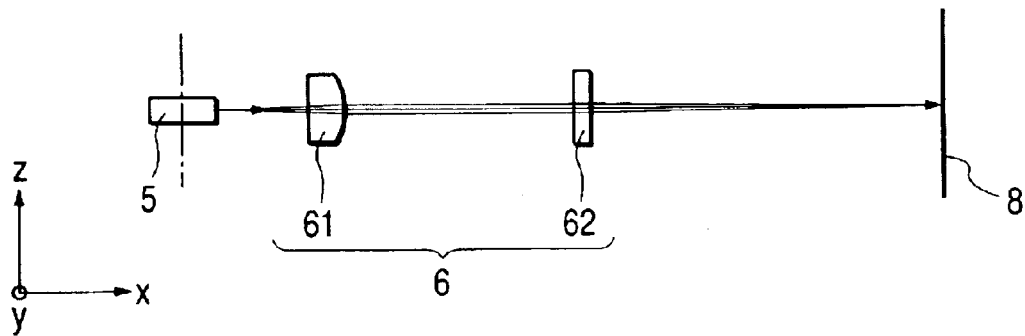
FIG. 2 is a cross sectional view showing construction of a main portion in a sub scanning direction according to the first embodiment of the present invention.

FIG. 1 is a cross sectional view of a main portion in a main scanning direction (main scanning cross sectional view) according to a first embodiment of a scanning optical apparatus (multi-beam scanning optical apparatus) of the present invention, and FIG. 2 is a cross sectional view of a main portion in a sub scanning direction of FIG. 1.

By the way, in the present specification, a direction along which light beam is reflected and deflected (deflection-scanned) by a deflecting element 5 is defined as a main scanning direction, and a direction which is perpendicular to an optical axis of a scanning optical element 6 and the main scanning direction is defined as a sub scanning direction.

In FIG. 1, reference numeral 1 designates a light source which-is comprised of a multi-beam semiconductor laser (multi-beam light source) having a plurality of light emitting points 1a and 1b (two light emission points in the present embodiment).

In FIG. 1, for the sake of convenience of the description, of the two light emitting points 1a and 1b, only the necessary light emitting point 1a is illustrated.

Reference numeral 3 designates an aperture stop for limiting two light beams (quantity of light) emitted from the light source 1. Reference numeral 2 designates a collimator lens as a first optical element for converting optically the two light beams limited through the aperture stop 3 into substantially parallel light beams (or the diverged beams or the converged beams). Reference numeral 4 designates a cylindrical lens, as a second optical element, which has a predetermined refracting power only in the sub scanning direction and which serves to image the two light beams passed through the collimator lens 2 substantially in the form of a line image on a deflecting surface (polygon mirror surface) 5a of a light deflector 5 which will be described later in the sub scanning cross section.

By the way, each of the constituent elements such as the aperture stop 3, the collimator lens 2 and the cylindrical lens 4 constitutes one element of an incident optical system 9.

Reference numeral 5 designates an optical deflector constituted by a polygon mirror (rotating multi-mirror) for example which is rotated at constant speed in a direction indicated by an arrow A by a driver unit (not shown) such as a motor.

Reference numeral 6 designates a scanning optical element with the fθ characteristics which has a plastic toric lens (refracting element) 61 on the side of the polygon mirror 5 and a compound optical element (diffraction element) 62 on the side of the surface to be scanned with respect to a middle point between the axis of rotation of the polygon mirror and the surface to be scanned. The compound optical element 62 has an aspheric surface having the power only in the main scanning direction (a flat surface in the sub scanning direction) as the surface on the incident side and a surface obtained by adding a diffraction grating to a flat surface on the emission side. Here, as for the grating shape, for example, the Fresnel-like grating shape having a saw-tooth shaped diffraction grating made by the surface cutting, the stepped-like diffraction grating shape made by the photo etching, or the like is suitable therefor. In addition, in the present embodiment, the compound optical element 62 is made of plastic manufactured through the injection molding process. However, even in the case where a diffraction grating is formed on a glass substrate through the replica process to manufacture a grating, the same effects can be offered. Each of these optical elements 61 and 62 has the different powers in the main scanning direction and in the sub scanning direction and they serve to image the deflected luminous fluxes from the polygon mirror 5 on the surface 8 to be scanned in a spot-like shape and also to correct the tilt of the deflecting surface of the polygon mirror 5. Now, the deflecting surface 5a and the surface 8 to be scanned become nearly conjugate.

But, the optical element 61 may be made of glass.

Reference numeral 8 designates a surface of a photosensitive drum as the surface to be scanned.

In the present embodiment, the two diverged light beams (only one light beam is illustrated in the figure) which have been optically modulated in accordance with the image information to be emitted from the multi-beam semiconductor laser 1 are limited (in quantity of light) through the aperture stop 3 and then are optically converted into substantially the parallel light beams through the collimator lens 2 to be inputted into the cylindrical lens 4 after limitation of the fluxes (limitation in quantity of light of the luminous fluxes) through the aperture stop 3. The two substantially parallel light beams entered into the cylindrical lens 4 emerge as they are within the main scanning cross section. In addition, they are converged within the sub scanning cross section to be imaged substantially in the form of a line image (a line image elongated in the main scanning direction) on the deflecting surface 5a of the optical deflector (polygon mirror) 5. Then, the two light beams deflected by the deflecting surface 5a of the optical deflector 5 are imaged in a spot-like shape on the photosensitive drum surface 8 through the plastic toric lens 61 and the compound optical element 62. The optical deflector 5 is rotated in a direction indicated by an arrow A to thereby scan the photosensitive drum surface 8 with the formed image at constant speed in a direction indicated by an arrow B (main scanning direction). Thereby, the image recording is carried out for the photosensitive drum surface 8 as the recording medium.

The surface shape of a refracting surface in the present invention is expressed on the basis of the following shape expression formula.

When an intersection between each lens surface and the optical axis is defined as an origin, the optical axis direction is defined as the x-axis, the axis intersecting perpendicularly the optical axis within the main scanning cross section is defined as the y-axis, and the axis intersecting perpendicularly the optical axis within the sub scanning cross section is defined as the z-axis, the surface shape in the meridional direction corresponding to the main scanning direction is expressed as follows.

Equation 1

$$X = \frac{Y^2/R}{1 + (1-(1+K)(Y/R^2)^{1/2}} + B_4 Y^4 + B_6 Y^6 + B_8 Y^8 + B_{10} Y^{10}$$

where R is a radius of curvature, and K, $B_4$, $B_6$, $B_8$ and $B_{10}$ are aspheric surface coefficients.

The surface shape in the sagittal direction corresponding to the sub scanning direction (the direction containing the optical axis and intersecting perpendicularly the main scanning direction) is expressed as follows.

Equation 2

$$S = \frac{Z^2/r'}{1 + (1-(Z/r')^2)^{1/2}}$$

Here, $r' = r_0(1 + D_2 Y^2 + D_4 Y^4 + D_6 Y^6 + D_8 Y^8 + D_{10} Y^{10})$ where $r_0$ is a sagittal curvature radius on the optical axis, and $D_2$, $D_4$, $D_6$, $D_8$ and $D_{10}$ are coefficients.

By the way, the sagittal curvature radius r' outside the optical axis is defined within a surface containing a normal of a meridian (generatrix) in each position and intersecting perpendicularly the main scanning surface.

The shape of a surface of diffraction in the present invention is expressed on the basis of the following phase expression formula expressed by a phase function in which the main scanning direction is of up to the tenth-order, and the sub scanning direction is of the second order and differs depending on the position of the main scanning direction.

$$\phi = m\lambda = b_2 Y^2 + b_4 Y^4 + b_6 Y^6 + b_8 Y^8 + b_{10} Y^{10} + (d_0 + d_1 Y + d_2 Y^2 + d_3 Y^3 + d_4 Y^4) Z^2$$

where m is the degree of diffraction: the diffracted light of plus first order is used in the first to third embodiments.

By the way, while each of the shape expression formula and the phase expression formula is expressed by the function having the polynominal of up to the specific degree, the degree is allowed to be equal to or higher than that degree or equal to or lower than that degree.

Figure 3:
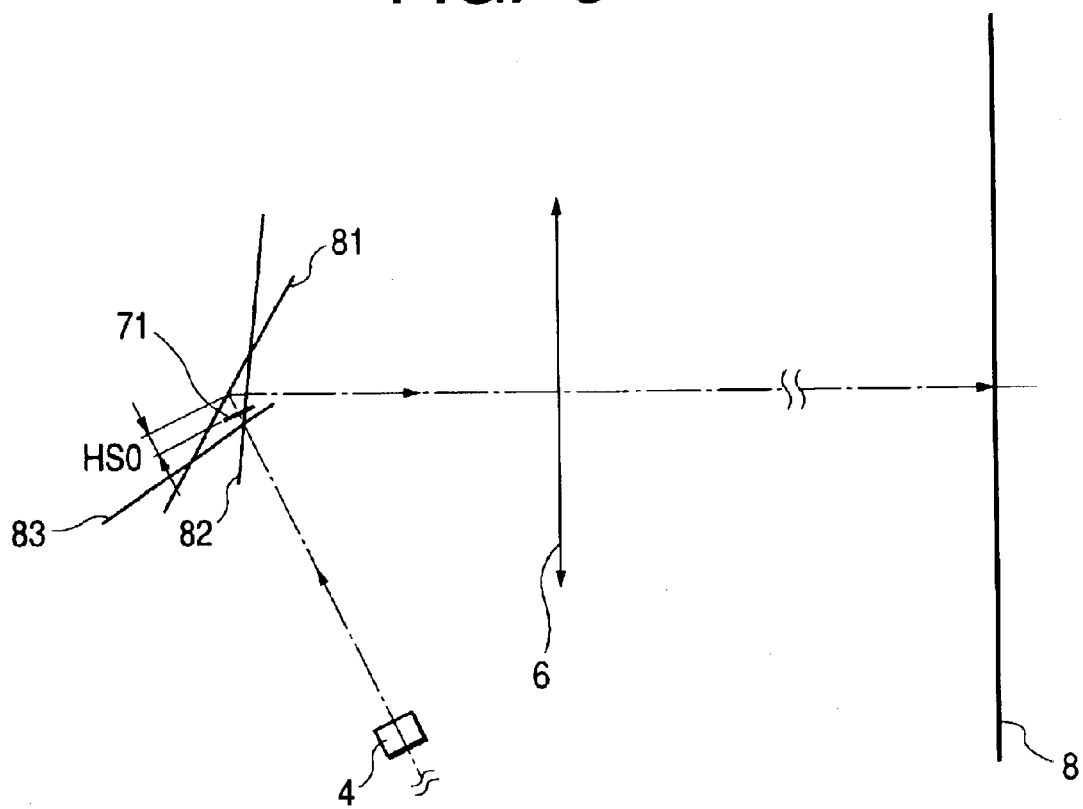
FIG. 3 is an enlarged view of the vicinity of a polygon mirror according to the first embodiment of the present invention.

FIG. 3 is an enlarged view of the vicinity of the polygon mirror 5 in the present embodiment, and shows the motion of polygon mirror surfaces accompanying the rotational operation of the polygon mirror 5. In the figure, a polygon mirror surface 81 is a mirror surface for the light beam to travel on the optical axis of the scanning optical element 6, and polygon mirror surfaces 82 and 83 are mirror surfaces for the light beam to travel towards the outermost off-axis, respectively. Thus, it is shown that the deflecting (reflecting) point differs depending on the angle of deflection of the light beam. In addition, the line image 71 obtained through the cylindrical lens 4 is located between the mirror surface 81 and the mirror surface 83. Then, in the case where a surface in which the wave aberration in the sub scanning cross section becomes least (hereinafter, referred to as "the best image surface" for short) is present on the surface to be scanned, the mirror surface and the surface to be scanned become perfectly conjugate in the image height which is deflected when the line image and the mirror surface overlap each other.

Numerical values in the scanning optical apparatus of the present embodiment are shown in Table-1.

TABLE 1

| Design Data | | | | | | | |
|---|---|---|---|---|---|---|---|
| Wavelength, Refractive Index | | | Surface Configuration of Toric Lens 61 | | Surface Configuration of Long Diffraction Element 62 | | |
| Wavelength Used | λ (nm) | 780 | First Surface | Second Surface | | First Surface | Second Surface |
| Refractive Index of Toric Lens 61 | ndt | 1.53064 | R | −8.84696E+01 | −4.63992E+01 | R | −3.92336E+02 | ∞ |
| Abbe's Number of Toric Lens 61 | νdt | 55.5 | K | −5.39190E−01 | −8.46048E−01 | K | −6.01601E+01 | |
| Refractive Index of Long Diffraction Element 62 | ndd | 1.53064 | B4 | 1.16004E−06 | 3.12272E−07 | B4 | 2.11808E−07 | |
| Abbe's Number of Long Diffraction Element 62 | νdd | 55.5 | B6 | 1.34535E−09 | 5.20228E−10 | B6 | −2.03707E−11 | |
| Beam Angle | | | B8 | −1.08687E−12 | 5.33696E−13 | B8 | 1.13519E−15 | |
| Incidence Angle on Polygon | θp | −70.0 | B10 | 1.83812E−16 | −3.91099E−16 | B10 | −2.89613E−20 | |
| Max. Exit Angel From Polygon | θe | 45.0 | r | 1.49643E+02 | −2.29406E+01 | Phase Coefficient of Long Diffraction Element 62 | | |
| | | | D2s | | 1.48383E−04 | | First Surface | Second Surface |
| Arrangement | | | D4s | | 2.32768E−08 | b2 | | −2.00698E−04 |

TABLE 1-continued

Design Data

| Wavelength, Refractive Index | | | Surface Configuration of Toric Lens 61 | | | Surface Configuration of Long Diffraction Element 62 | |
|---|---|---|---|---|---|---|---|
| Wavelength Used | λ (nm) | 780 | First Surface | Second Surface | | First Surface | Second Surface |
| Polygon Surface to Toric Lens | e1 | 30.0 | D6s | −8.83297E−13 | b4 | | 1.44782E−08 |
| Center Thickness of Toric Lens | d1 | 11.0 | D2e | 2.08525E−04 | b6 | | −2.67807E−12 |
| Toric Lens to Long Diffraction Element | e2 | 75.0 | D4e | −2.27510E−08 | b8 | | 2.30099E−16 |
| Center Thickness of long Diffraction Element | d2 | 5.0 | D6e | 2.67175E−11 | b10 | | −7.63301E−21 |
| Long Diffraction Element to Surface to be scanned | Sk | 111.0 | | | d0 | | −5.11153E−03 |
| polygon Axis to Surface to be scanned | L | 232.0 | Subscript "s" indicates the laser side | | d1 | | 1.30525E−06 |
| Effective Scanning width | W | 297.0 | Subscript "e" indicates the side opposite to the laser side | | d2 | | 6.91743E−08 |
| | | | Sign "+" on Y-Axis indicates the side opposite to the laser side | | d3 | | −5.66373E−11 |
| | | | | | d4 | | 5.16727E−13 |
| | | | First Embodiment | | | | |

Figure 4:
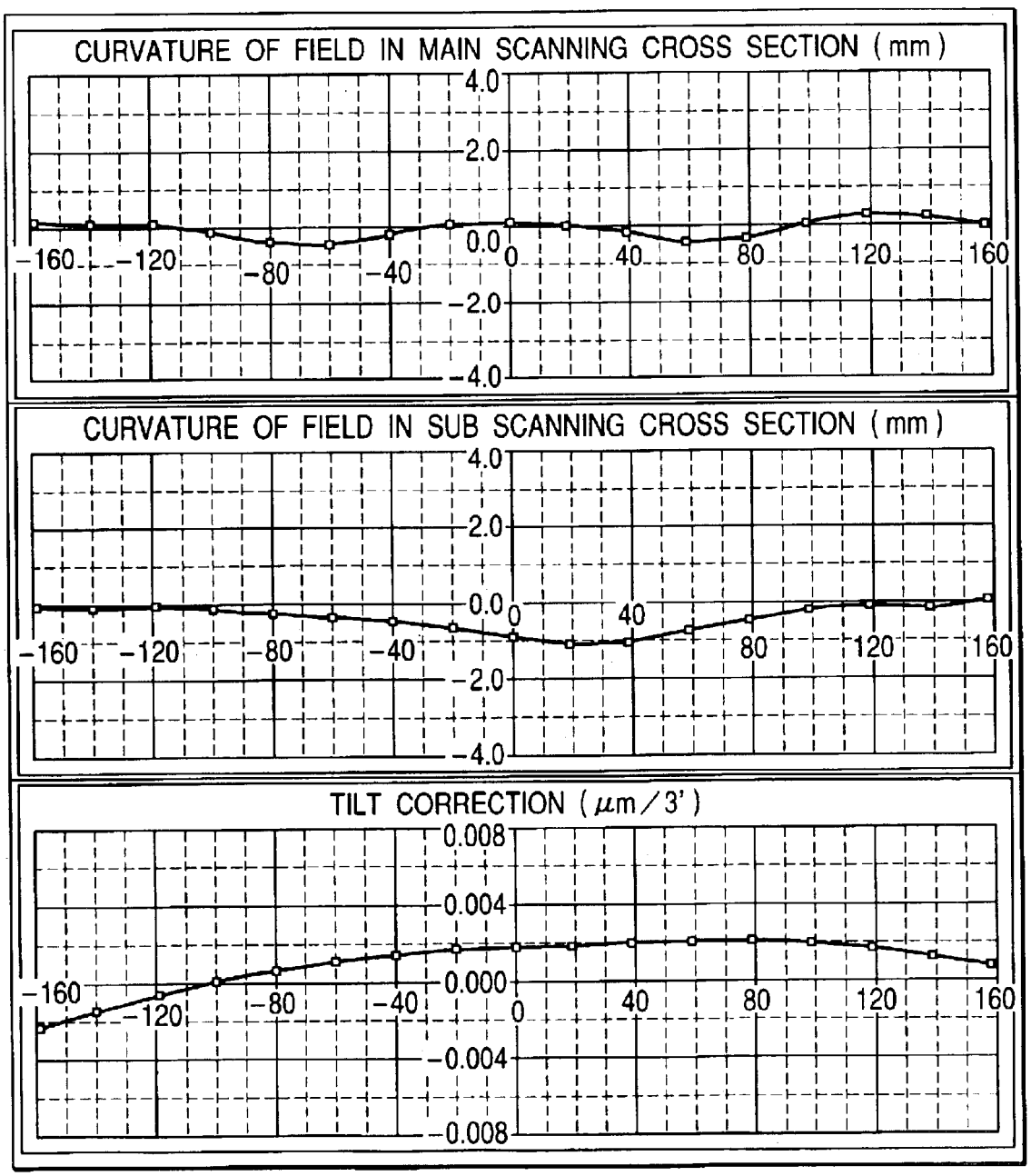
FIG. 4 is graphical representation useful in explaining a position of an image surface and an irradiation position due to surface tilt according to the first embodiment of the present invention.

FIG. 4 shows the positions of the image surfaces (the curvatures of field in the main scanning and sub scanning cross sections), and the irradiation position when the polygon mirror surface is tilted. By the way, the position of the image surface in the figure does not indicate the paraxial imaging point, but indicates the imaging point at which the wave aberration becomes least. This imaging point becomes the point coinciding nearly with the depth center when the depth is defined at the slice level 1.2 times as large as the best spot diameter.

In the present embodiment, as shown in the figure, the position (imaging point) where the wave aberration in the sub scanning cross section of the light beam either on the optical axis (the optical axis of the scanning optical element 6 ) or in the vicinity thereof (hereinafter, it is also referred to as "the light beam on the optical axis" for short) becomes least is located on the optical deflector 5 side with respect to the surface 8 to be scanned (the position of the image surface is negative).

Figure 5:
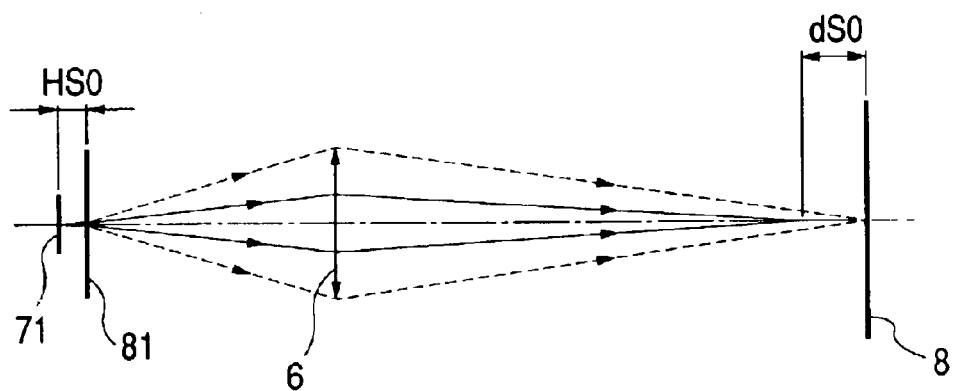
FIG. 5 is a schematic cross sectional view showing construction of a main portion in the sub scanning direction on an optical axis of the first embodiment of the present invention.

FIG. 5 is a schematic cross sectional view of a main portion in the sub scanning direction on the optical axis of the present embodiment. In the figure, solid lines indicate the actual light beam, and dotted lines show the conjugate relationship from the polygon mirror surface. It is shown in the figure that the position where the wave aberration in the sub scanning cross section becomes least is not located on the surface to be scanned, but is located on the optical deflector side with respect to the surface to be scanned, whereby the relationship between a polygon mirror surface 81 for deflecting the light beam towards the optical axis and the surface 8 to be scanned comes closer to the perfect conjugate relationship.

Figure 6:
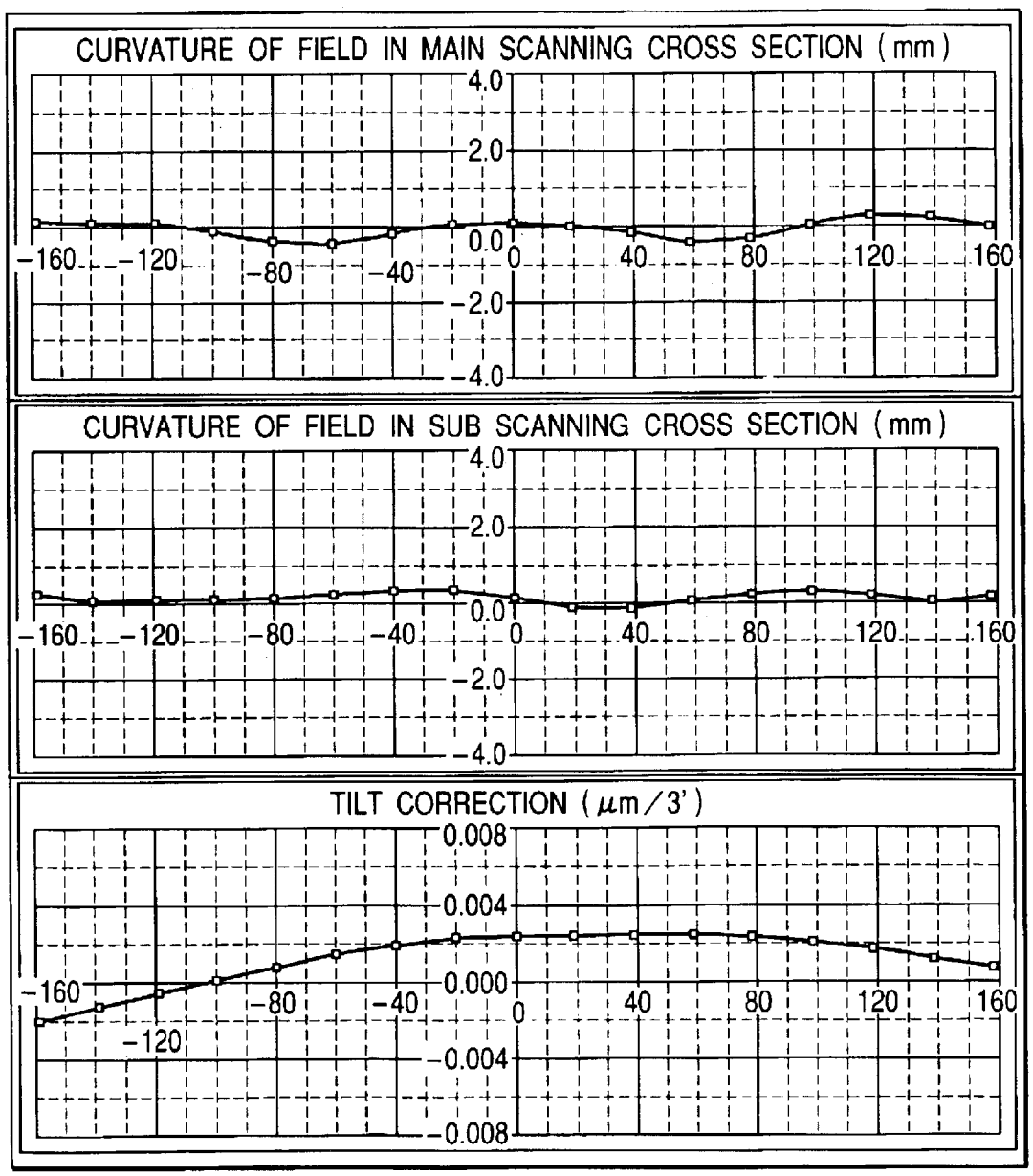
FIG. 6 is graphical representation useful in explaining a position of an image surface and an irradiation position due to surface tilt in a comparative example.

The positions of the image surfaces of a general design example when the position where the wave aberration in the sub scanning cross section becomes least is located on the surface to be scanned (the curvatures of field in the main scanning and sub scanning cross sections), and the irradiation position when the polygon mirror surface is tilted are shown as a reference example in FIG. 6. Comparing FIG. 6 with FIG. 4, then it is understood that the effect of correcting the tilt of the polygon mirror surface of the present embodiment is great, i.e., the variation in the irradiation position when the surface is tilted is small.

In this embodiment, when the lateral magnification in the sub scanning cross section of the scanning optical element 6 is βs, the following condition is met:

$$1 \leq |\beta s| \leq 3.5.$$

In addition, in the present embodiment, when the distance from the surface 8 to be scanned to the position where the wave aberration in the sub scanning cross section of the luminous fluxes on the optical axis becomes least is dS0, the distance from the deflection point of the light beam on the optical axis (the position of the polygon mirror surface 81 ) to the imaging position 71 in the sub scanning cross section of the cylindrical lens 4 is HS0, and the lateral magnification in the sub scanning cross section of the scanning optical element 6 is βs, the elements are set so as to meet the following Expression (1).

$$HS0 \times \beta s^2 \leq dS0 < 0.1 HS0 \times \beta s^2 \tag{1}$$

The distance dS0 is set so as to meet the above conditional Expression (1), whereby the effect of correcting the tilt of the polygon mirror surface can be enhanced while holding the degradation of the imaging performance due to defocus to a minimum.

If dS0 becomes larger than the upper limit value of the above conditional Expression (1), then it is not better because the curvature of field in the sub scanning cross section gets worse. On the other hand, if dS0 becomes smaller than the lower limit value of the conditional Expression (1), then it is not better because the effect of improving the correction of the tilt of the polygon mirror surface is deteriorated.

Since in the present embodiment, the condition of βs=−2.76 and HS0=−0.62 is established, the relationship of −4.72≤dS0<−0.47 is obtained. Then, the relationship of dS0=−0.91 mm is set to thereby meet the above conditional Expression (1).

In the present embodiment, more preferably, it is better to set the range of numerical values of the above conditional Expression (1) as follows.

$$HS0 \times \beta s^2 \leq dS0 < 0.1 HS0 \times \beta s^2 \tag{1a}$$

Above, in the present embodiment, it is possible to provide a scanning optical apparatus in which the variation in the irradiation position due to the surface tilt exerts a large influence on an image, the apparatus being adapted to high quality image recording and being capable of enhancing the function of correcting the surface tilt while meeting the curvature of field in the sub scanning cross section by utilizing an easy and simple method and of suppressing the irradiation position shift due to the surface tilt of the deflecting surface to the less degree.

By the way, while in the present embodiment, the light source is comprised of the multi-beam light source having two light emission points, the present invention is not intended to be limited thereto. That is to say, even if the light source, for example, is comprised of a single beam light source or a multi-beam light source having three or more light emission points, the present invention offers the same effects as those in the above-mentioned first embodiment.

In addition, in the present embodiment, the light beam from the light source 1 may be directly introduced into the optical deflector 5 without using the collimator lens 2, the cylindrical lens 4 and the like.

(Second Embodiment)

Figure 7A:
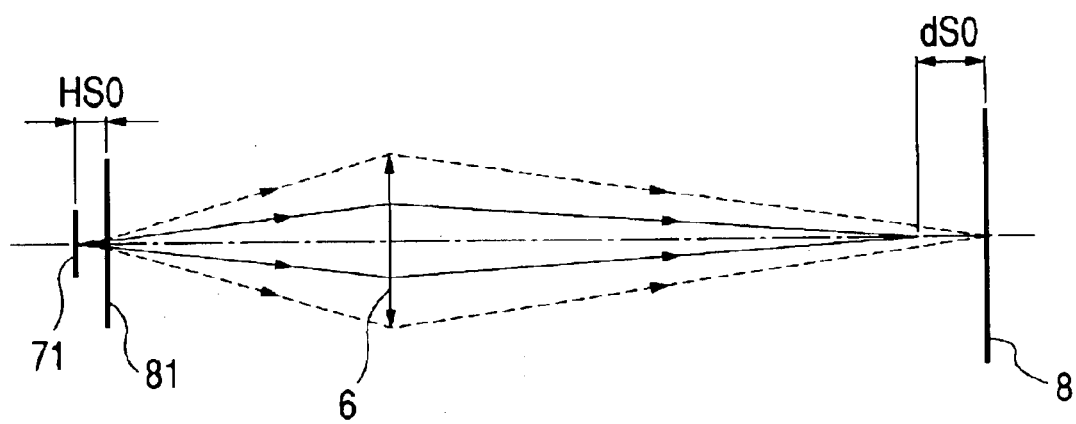
FIGS. 7A and 7B are respectively a schematic cross sectional view showing a main portion of light beam on an optical axis in a sub scanning direction of a scanning optical element according to a second embodiment of the present invention, and a schematic cross sectional view showing a main portion of the outermost off-axis light beam in a sub scanning direction of a scanning optical element according to a second embodiment of the present invention.
Figure 7B:
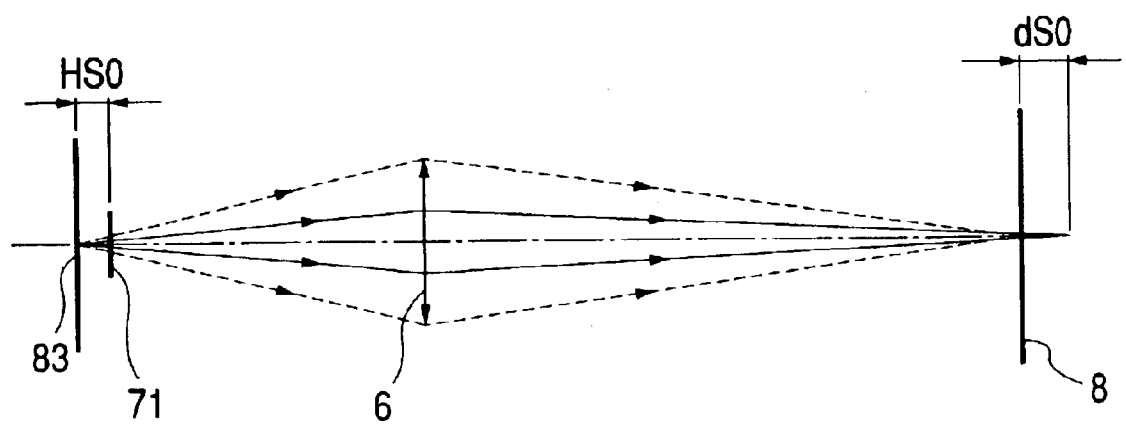

FIGS. 7A and 7B are respectively schematic cross sectional views of a main portion in the sub scanning direction according to a second embodiment of the scanning optical apparatus of an important portion of the present invention. In these figures, the same constituent elements as those shown in FIG. 3 are designated with the same reference numerals.

A point of difference between the present embodiment and the above-mentioned first embodiment is that the position where the wave aberration in the sub scanning cross section of the outermost off-axis light beam on the light source side (hereinafter, it is also referred to as "the outermost off-axis beam" for short)(the light beam reflected by the polygon mirror 83 surface) of the light beam entered into the scanning optical element 6 becomes least is located on the side opposite to the optical deflector 5 side with respect to the surface 8 to be scanned. Other construction and optical function are substantially the same as those of the first embodiment, and hence the same effects are offered.

That is to say, FIG. 7A shows the light beam on the optical axis, and FIG. 7B shows the outermost off-axis beam at the light source side. For the light beam on the optical axis, similarly to the above-mentioned first embodiment, the position where the wave aberration in the sub scanning cross section becomes least (imaging point) is located on the optical deflector 5 side with respect to the surface 8 to be scanned (the position of the image surface is negative) to thereby enhance the effect of correcting the surface tilt on the optical axis.

Furthermore, in the present embodiment, the position where the wave aberration in the sub scanning cross section of the outermost off-axis beam becomes least is located on the side opposite to the optical deflector 5 side with respect to the surface 8 to be scanned, whereby even in the outermost off-axis beam as well, the relationship between the polygon mirror surface 83 and the surface 8 to be scanned is adapted to come closer to the perfect conjugate relationship. As a result, not only for the light beam on the optical axis, but also for the vicinity of the outermost off-axis beam, the effect of correcting the surface tilt can be enhanced.

Numerical values in the scanning optical apparatus according to the second embodiment are shown in Table-2.

TABLE 2

Design Data

| Wavelength, Refractive Index | | | Surface Configuration of Toric Lens 61 | | | Surface Configuration of Long Diffraction Element 62 | | |
|---|---|---|---|---|---|---|---|---|
| Wavelength Used | λ (nm) | 780 | | First Surface | Second Surface | | First Surface | Second Surface |
| Refractive Index of Toric Lens 61 | ndt | 1.53064 | R | −8.84696E+01 | −4.63992E+01 | R | −3.92336E+02 | ∞ |
| Abbe's Number of Toric Lens 61 | νdt | 55.5 | K | −5.39190E−01 | −8.46048E−01 | K | −6.01601E+01 | |
| Refractive Index of Long Diffraction Element 62 | ndd | 1.53064 | B4 | 1.16004E−06 | 3.12272E−07 | B4 | 2.11808E−07 | |
| Abbe's Number of Long Diffraction Element 62 | νdd | 55.5 | B6 | 1.34535E−09 | 5.20228E−10 | B6 | −2.03707E−11 | |
| Beam Angle | | | B8 | −1.08687E−12 | 5.33696E−13 | B8 | 1.13519E−15 | |
| Incidence Angle on Polygon | θp | −70.0 | B10 | 1.83812E−16 | −3.91099E−16 | B10 | −2.89613E−20 | |
| Max. Exit Angel From Polygon | θe | 45.0 | r | 1.49643E+02 | −2.29406E+01 | Phase Coefficient of Long Diffraction Element 62 | | |
| | | | D2s | | 1.48383E−04 | | First Surface | Second Surface |
| Arrangement | | | D4s | | 3.03565E−08 | b2 | | −2.00698E−04 |
| Polygon Surface to Toric Lens | e1 | 30.0 | D6s | | −1.12277E−13 | b4 | | 1.44782E−08 |
| Center Thickness of Toric Lens | d1 | 11.0 | D2e | | 2.12176E−04 | b6 | | −2.67807E−12 |
| Toric Lens to Long Diffraction Element | e2 | 75.0 | D4e | | −2.32388E−08 | b8 | | 2.30099E−16 |
| Center Thickness of long Diffraction Element | d2 | 5.0 | D6e | | 3.06269E−11 | b10 | | −7.63301E−21 |
| Long Diffraction Element to Surface to be scanned | Sk | 111.0 | | | | d0 | | −5.11153E−03 |
| polygon Axis to Surface to be scanned | L | 232.0 | Subscript "s" indicates the laser side | | | d1 | | 1.30525E−06 |
| Effective Scanning width | W | 297.0 | Subscript "e" indicates the side opposite to the laser side | | | d2 | | 6.91743E−08 |
| | | | Sign "+" on Y-Axis indicates the side opposite to the laser side | | | d3 | | −5.66373E−11 |
| | | | | | | d4 | | 5.16727E−13 |
| | | | Seoncd Embodiment | | | | | |

Figure 8:
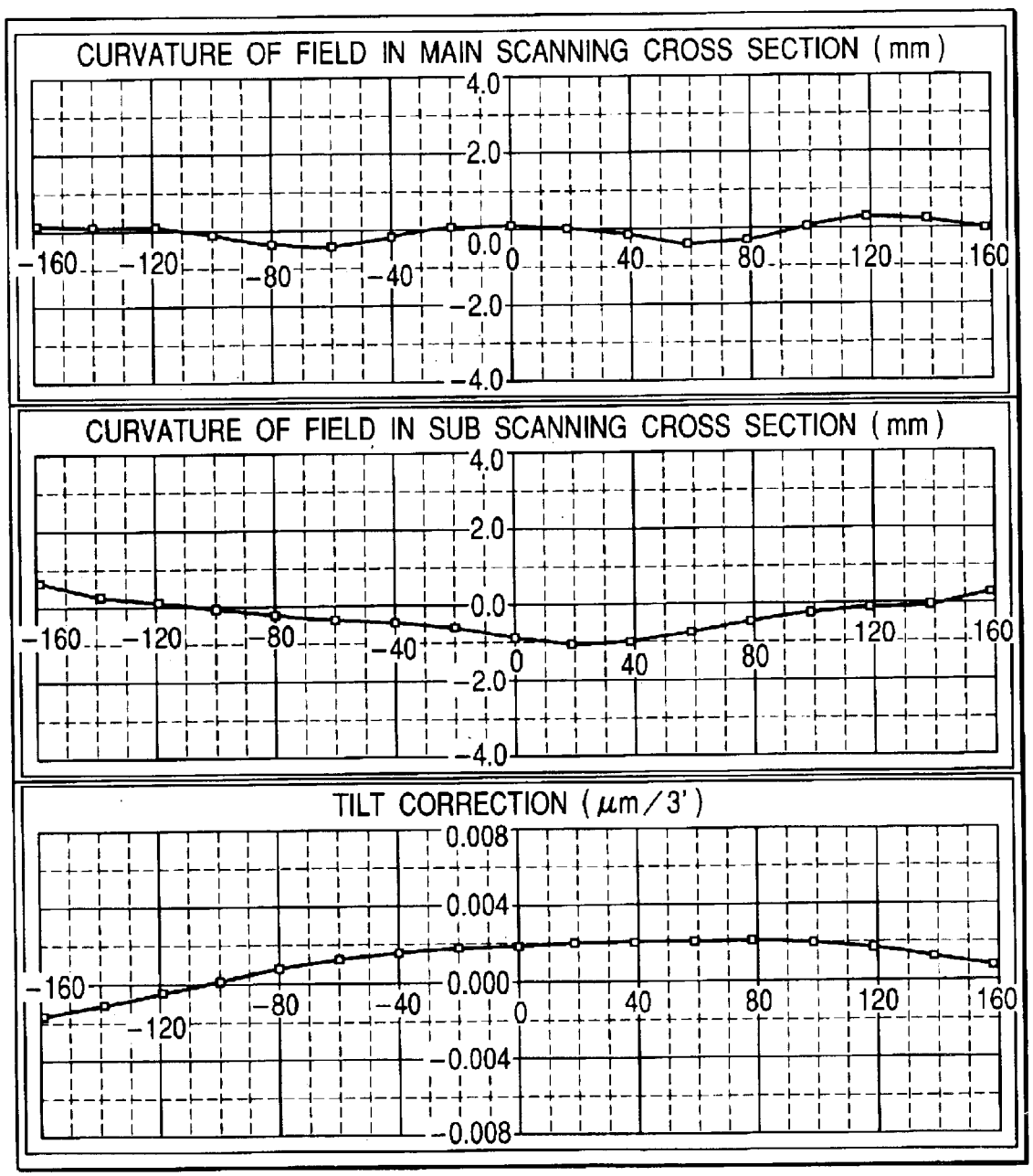
FIG. 8 is graphical representation useful in explaining a position of an image surface, and an irradiation position due to surface tilt of the second embodiment of the present invention.

FIG. 8 shows the positions of the image surfaces (the curvatures of field in the main scanning and sub scanning cross sections) and the irradiation position when the polygon mirror surface is tilted in the present embodiment. Comparing FIG. 8 with the result of the reference example shown in FIG. 6, then it is understood that in both the light beam on the optical axis and the outermost off-axis beam, the effect of correcting the tilt of the polygon mirror surface in the present embodiment is great, i.e., the variation in the irradiation position when the surface is tilted is small.

But, the minus side of the axis of abscissa (image height) in FIG. 8 corresponds to the light source 1 side.

By the way, in the present embodiment, the position where the wave aberration in the sub scanning cross section of the outermost off-axis beam on the side opposite to the light source 1 side (the luminous fluxes reflected by the polygon mirror 82 surface) becomes least is located on the side opposite to the optical deflector 5 side with respect to the surface 8 to be scanned. Thereby, the same effects as those of the above-mentioned first embodiment are also offered.

As described above, in the present embodiment, it is possible to provide a scanning optical apparatus in which the variation in the irradiation position due to the surface tilt exerts a large influence on an image, the scanning optical apparatus being adapted to the high quality image recording and being capable of enhancing the function of correcting the surface tilt while meeting the curvature of field in the sub scanning cross section by utilizing an easy and simple method and of suppressing the irradiation position shift due to the surface tilt of a deflecting surface to the less degree.

By the way, while in the present embodiment, the light source is comprised of the multi-beam light source having two light emission points, the present invention is not intended to be limited thereto. That is to say, even if the light source, for example, is comprised of a single beam light source, or a multi-beam light source having three or more light emission points, the present invention offers the same effects as those in the above-mentioned second embodiment.

In the present embodiment as well, the conditional Expression (1) and (1a) are met.

(Third Embodiment)

Figure 9:
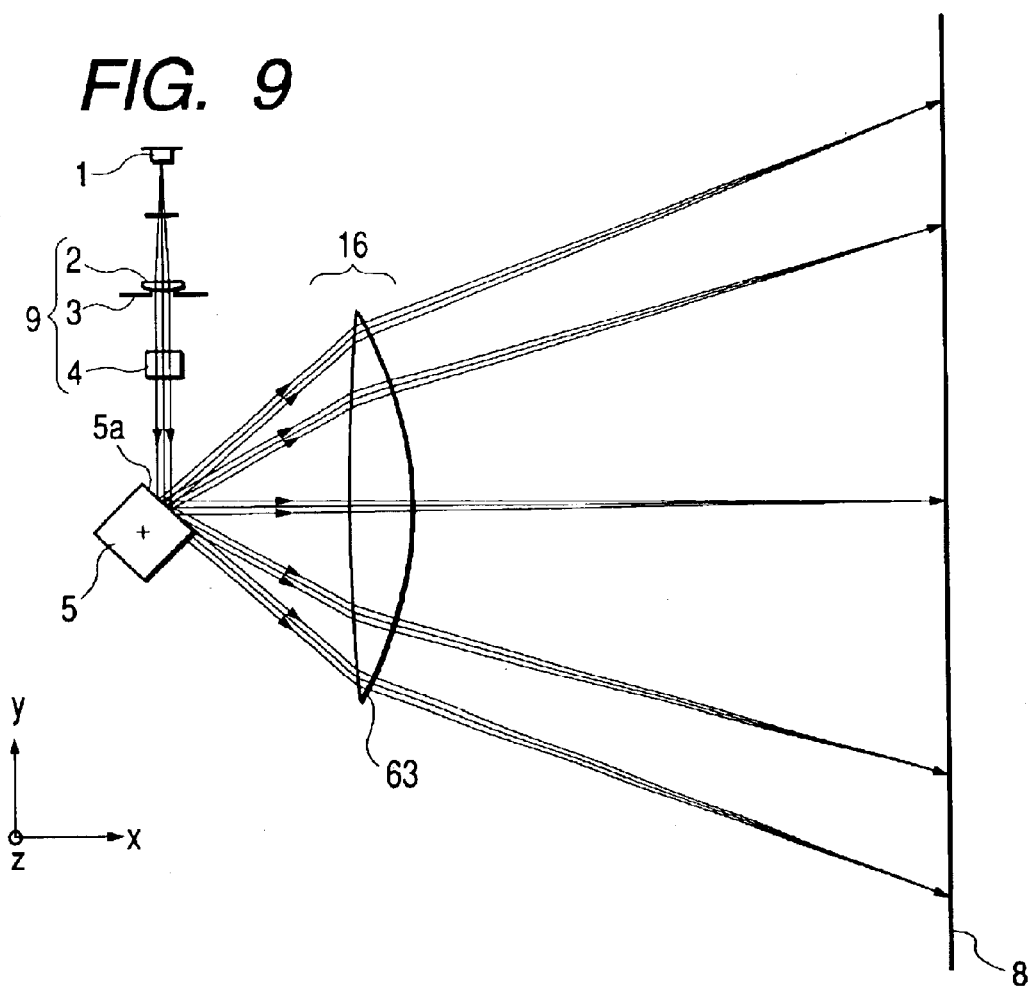
FIG. 9 is a cross sectional view showing construction of a main portion in a main scanning direction according to a third embodiment of the present invention.
Figure 10:
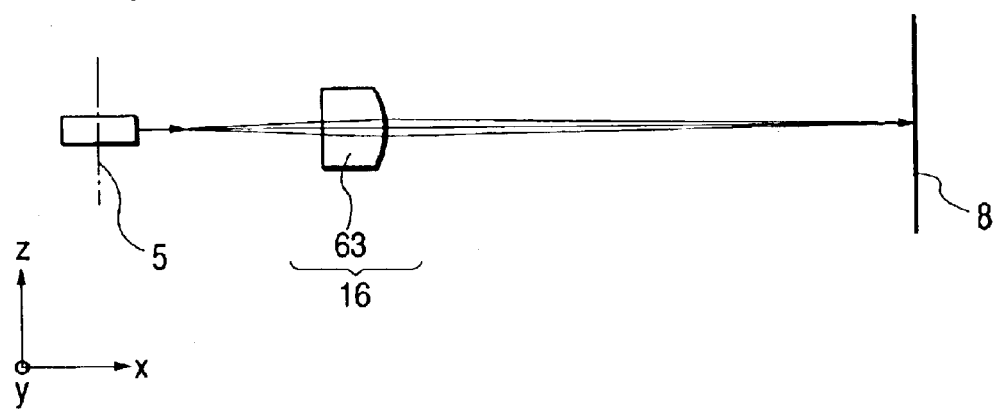
FIG. 10 is a cross sectional view showing construction of a main portion in a sub scanning direction according to the third embodiment of the present invention.

FIG. 9 is a cross sectional view of a main portion in the main scanning direction (main scanning cross sectional view) according to a third embodiment of the scanning optical apparatus of the present invention, and FIG. 10 is a cross sectional view of a main portion in the sub scanning direction (sub scanning cross sectional view) of FIG. 9. In FIGS. 9 and 10, the same constituent elements as those shown in FIGS. 1 and 2 are designated with the same reference numerals.

Points of difference between the present embodiment and the above-mentioned first embodiment are that a single optical element (single lens) 63 is used in a scanning optical element 16, and that the position where the wave aberration in the sub scanning cross section of the outermost off-axis beam on the light source side of the light beam incident on the scanning optical element 16 is located on the side opposite to the optical deflector 5 side with respect to the surface 8 to be scanned. Other construction and optical function are substantially the same as those of the first embodiment. As a result, the same effects are offered.

That is to say, in FIGS. 9 and 10, reference numeral 16 designates the scanning optical element which is constituted by the single lens 63.

In the present embodiment as well, similarly to the above-mentioned first embodiment, the position (imaging point) where the wave aberration in the sub scanning cross section of the light beam on the optical axis becomes least is located on the optical deflector 5 side with respect to the surface 8 to be scanned (the position of the image surface is negative) to thereby enhance the effect of correcting the surface tilt on the optical axis. Furthermore, the position where the wave aberration in sub scanning cross section of the outermost off-axis beam becomes least is located on the side opposite to the optical reflector 5 side with respect to the surface 8 to be scanned, whereby even in the outermost off-axis beam as well, the relationship between the polygon mirror surface $5a$ and the surface 8 to be scanned is adapted to closer to the perfect conjugate relationship. As a result, not only for the luminous fluxes on the optical axis, but also in the vicinity of the outermost off-axis beam, the effect of correcting the surface tilt can be enhanced.

Numeric values in the scanning optical apparatus according to the second embodiment are shown in Table-3.

TABLE 3

| | | | | | | | |
|---|---|---|---|---|---|---|---|
| Design Data | | | | | | | |
| Wavelength, Refractive Index | | | (Main Scanning) Surface Configuration of Toric Lens | | | (Sub Scanning) Surface Configuration of Toric Lens | |
| | | | First Surface | Second Surface | | First Surface | Second Surface |
| Wavelength Used | λ (nm) | 780 | | | | | |
| Refractive Index of Toric Lens | nd | 1.53064 | R | 4.27400E+02 | −9.47135E+01 | r ∞ | −2.32654E+01 |
| Abbe's Number of Toric Lens | νd | 55.5 | K | 3.71366E+00 | | D2s | 7.09230E−05 |
| Beam Angle | | | B4 | −1.85091E−07 | | D4s | −1.68605E−09 |
| Incidence Angle on Polygon | θp | 90.0 | B6 | 3.44576E−11 | | D6s | −3.29865E−13 |
| Max. Exit Angle From Polygon | θe | 40.9 | B8 | −6.82420E−15 | | D8s | 4.54210E−16 |
| Arrangement | | | B10 | 7.10650E−19 | | D10s | |
| Polygon Surface to First Surface of Toric Lens | e1 | 51.45 | | | | D2e | 5.91230E−05 |
| Center Thickness of Toric Lens | d1 | 17.90 | | | | D4e | 1.20544E−08 |
| Second Surface of Toric Lens to Surface to be scanned | e2 | 147.28 | | | | D6e | −5.68487E−12 |
| Effective Scanning width on the Surface to be scanned | W | 214.0 | Subscript "s" indicates the laser side | | | D8e | 1.15867E−15 |

TABLE 3-continued

Design Data

| Wavelength, Refractive Index | | | (Main Scanning) Surface Configuration of Toric Lens | | (Sub Scanning) Surface Configuration of Toric Lens | |
|---|---|---|---|---|---|---|
| Wavelength Used | λ (nm) | 780 | First Surface | Second Surface | First Surface | Second Surface |
| Other | | | Subscript "e" indicates the side opposite to the laser side | | D10e | |

Third Embodiment

Figure 11:
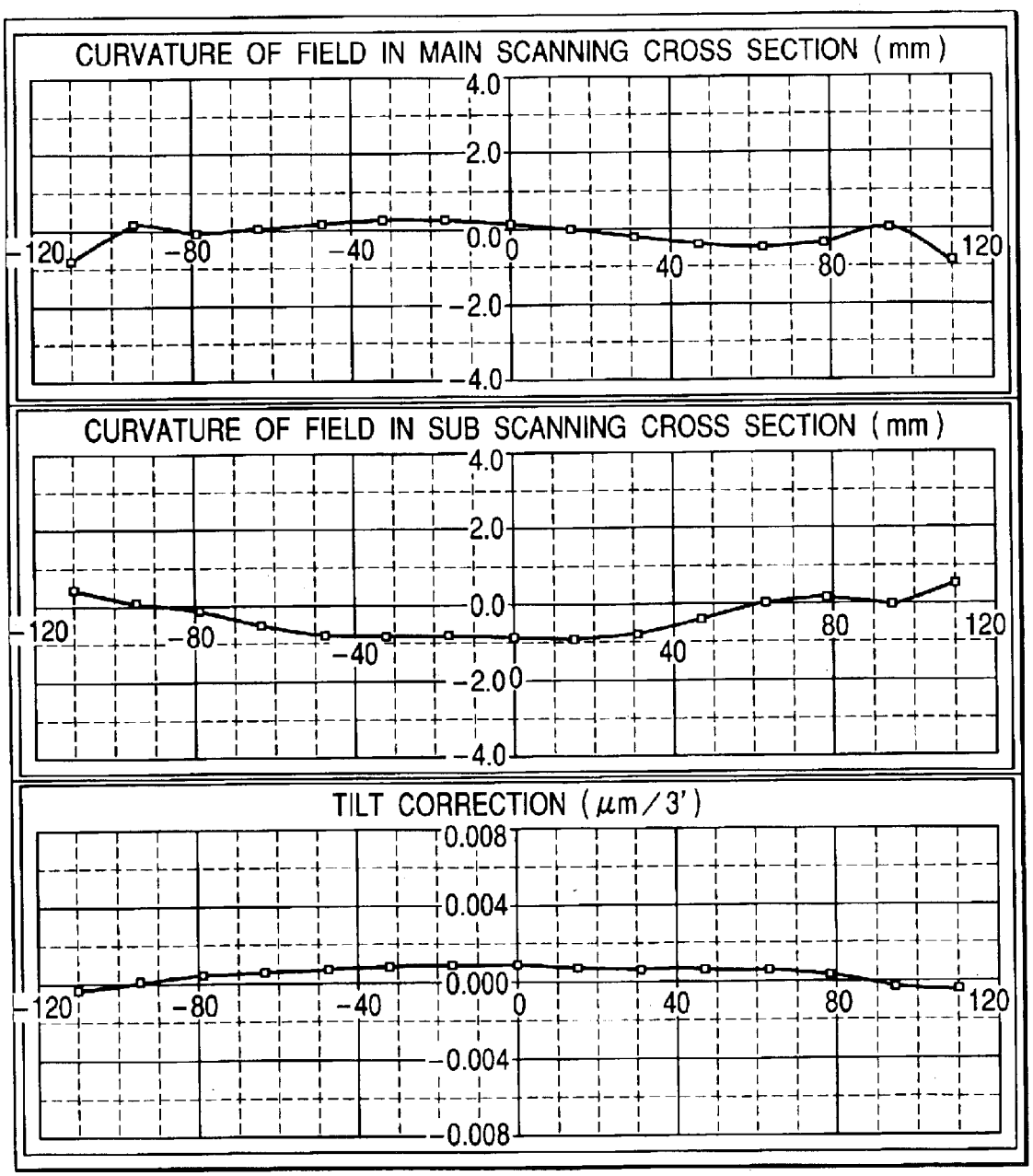
FIG. 11 is graphical representation useful in explaining a position of an image surface, and an irradiation position due to surface tilt according to the third embodiment of the present invention.

FIG. 11 shows the positions of the image surfaces (the curvatures of field in the main scanning and sub scanning cross sections) and the irradiation position when the polygon mirror surface is tilted in the present embodiment. Comparing FIG. 8 with the result of the reference example shown in FIG. 6, then it is understood that in both the light beam on the optical axis and the outermost off-axis beam, the effect of correcting the tilt of the polygon mirror surface in the present embodiment is great, i.e., the variation in the irradiation position when the surface is tilted is small.

But, the plus side of the axis of abscissa (image height) in FIG. 11 corresponds to the light source 1 side.

As described above, in the present embodiment, it is possible to provide a scanning optical apparatus in which the variation in the irradiation position due to the surface tilt exerts a large influence on an image, the scanning optical apparatus being adapted to the high quality image recording and being capable of enhancing the function of correcting the surface tilt while meeting the curvature of field in the sub scanning cross section by utilizing an easy and simple method and of suppressing the irradiation position shift due to the surface tilt of a deflecting surface to the less degree.

In addition, in the present embodiment, the scanning optical element is constituted by the single lens element, whereby it is possible to provide a scanning optical apparatus having simpler construction.

By the way, while in the present embodiment, the light source is comprised of the multi-beam source having two light emission points, the present invention is not intended to be limited thereto. That is to say, even if the light source, for example, is comprised of a single beam light source, or a multi-beam light source having three or more light emission points, the present embodiment offers the same effects as those of the above-mentioned first embodiment.

In the present embodiment as well, the conditional Expressions (1) and (1a) are met.

By the way, while in each of the above-mentioned embodiments, the scanning optical element is constituted by two elements which are refracting element and diffraction element, or by a single refracting element (single lens element), the present invention is not intended to be limited thereto. That is to say, the scanning optical element may be constituted by two or more refracting elements, or may be constituted by three or more optical elements including a refracting element and a diffraction element.

<Image Forming Apparatus>

Figure 12:
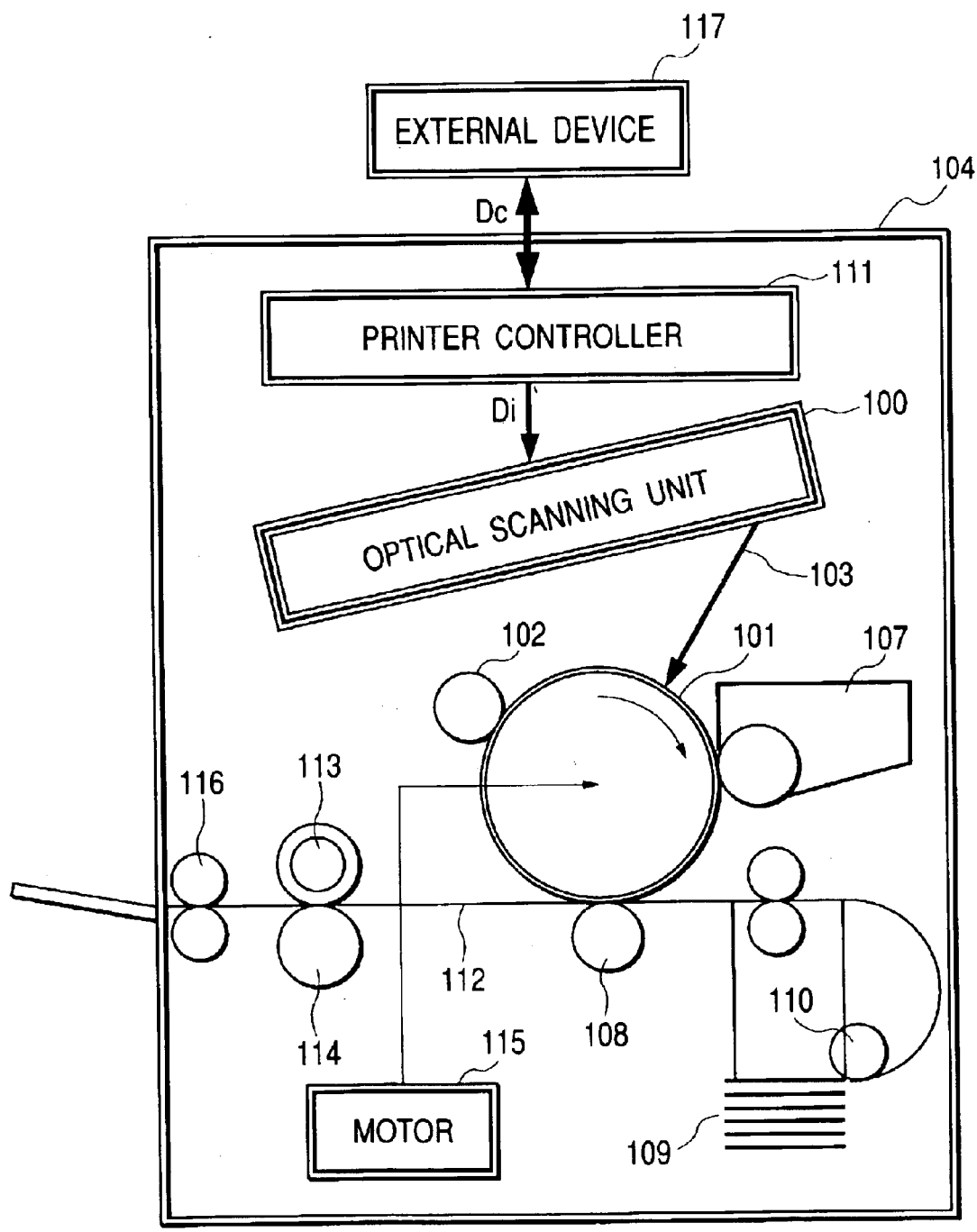
FIG. 12 is a cross sectional view of a main portion in a sub scanning direction showing a constructional example of an image forming apparatus (electrophotographic printer) using a scanning optical apparatus of the present invention.

FIG. 12 is a cross sectional view of a main portion in a sub scanning cross section showing an embodiment of an image forming apparatus (electrophotographic printer) using the scanning optical apparatus of the above-mentioned first, second or third embodiment. In FIG. 12, reference numeral 104 designates an image forming apparatus. Code data Dc is inputted from an external device 117 such as a personal computer to the image forming apparatus 104. The code data Dc is converted into image data (dot data) Di by a printer controller 111 provided inside the apparatus. The image data Di is inputted to an optical scanning unit 100 having the construction shown in the first, second or third embodiment. Then, a plurality of light beams (luminous fluxes) 103 which have been optically modulated in accordance with the image data Di are emitted from the optical scanning unit (scanning optical apparatus) 100, and a photosensitive surface of a photosensitive drum 101 is scanned in the main scanning direction with the plurality of light beams 103.

The photosensitive drum 101 as the electrostatic latent image carrier (photosensitive body) is rotated clockwise by a motor 115. Along with this rotation, the photosensitive surface of the photosensitive drum 101 is moved in the sub scanning direction perpendicular to the main scanning direction for the light beams 103. A charging roller 102 for charging electrostatically uniformly the surface of the photosensitive drum 101 is provided above the photosensitive drum 101 so as to be brought into contact with the surface of the drum 101. Then, the surface of the photosensitive drum 101 charged with electricity by the charging roller 102 is adapted to be irradiated with the plurality of light beams 103 through the scanning by the optical scanning unit 100.

As has already been described, the plurality of light beams 103 are optically modulated in accordance with the image data Di. Then, the electrostatic latent image is formed on the surface of the photosensitive drum 101 by the irradiation of a plurality of light beams 103. The electrostatic latent image is developed in the form of a toner image by a developing unit 107 which is arranged in the downstream side within the rotation cross section of the photosensitive drum 101 with respect to the position of irradiation of a plurality of light beams 103 so as to be brought into contact with the photosensitive drum 101.

The toner image developed by the developing unit 107 is transferred onto a sheet 112 as a material on which the toner image is to be transferred by a transfer roller (transfer unit) 108 which is provided below the photosensitive drum 101 so as to face the photosensitive drum 101. While the sheet 112 are received in a sheet cassette 109 provided forwardly with respect to the photosensitive drum 101 (on the right side in FIG. 12), the sheet can also be manually fed. A sheet feed roller 110 is arranged at the end portion of the sheet cassette 109 and adapted to convey a sheet 112 in the sheet cassette 109 to a conveying path.

The sheet 112 on which the unfixed toner image has been transferred is further conveyed to a fixing unit provided backwardly with respect to the photosensitive drum 101 (on the left side in FIG. 12). The fixing unit is constituted by a fixing roller 113 having in its inside a fixing heater (not shown) and a pressure roller 114 which is provided so as to pressure-contact with the fixing roller 113. Then, the sheet 112 conveyed from the transfer unit is heated while being pressed in the pressure contact portion between the fixing roller 113 and the pressure roller 114 to thereby fix the unfixed toner image on the sheet 112. Furthermore, a pair of sheet discharge rollers 106 are provided backwardly with respect to the fixing roller 113 and adapted to discharge the sheet 112 having the fixed toner image to the outside of the image forming apparatus.

While not illustrated in FIG. 12, the print controller 111 carries out not only the conversion of the data as has already been described, but also the control for portions in the image forming apparatus, including a motor 115, and a polygon motor and the like in the optical scanning unit 100.

<Color Image Forming Apparatus>

Figure 13:
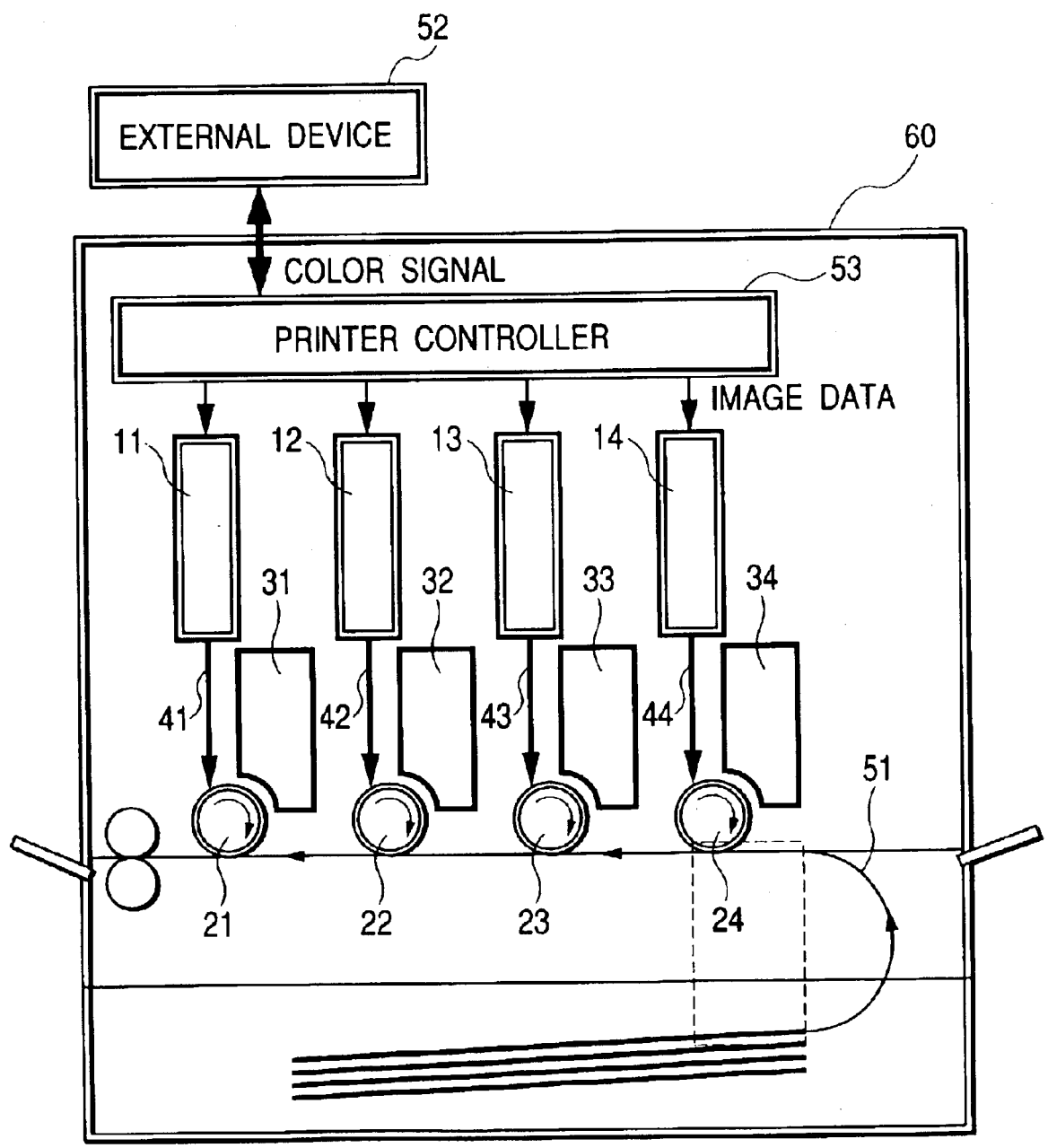
FIG. 13 is a schematic view showing construction of a main portion of a color image forming apparatus according to an embodiment of the present invention.

FIG. 13 is a schematic view of a main portion of a color image forming apparatus according to an embodiment of the present invention. The present embodiment relates to a tandem type color image forming apparatus in which four scanning optical apparatuses (multi-beam optical scanning apparatuses) are arranged to record image information on the surfaces of four photosensitive drums as image carriers which are arranged in parallel with the scanning optical apparatuses, respectively. In FIG. 13, reference numeral 60 designates a color image forming apparatus, reference numerals 11, 12, 13 and 14 respectively designate scanning optical apparatuses each having any one of the constructions described in the first, second or third embodiment, reference numerals 21, 22, 23 and 24 respectively designate photosensitive drums as image carriers, reference numerals 31, 32, 33 and 34 respectively designate developing units, and reference numeral 51 designates a conveying belt.

In FIG. 13, color signals R(red), G(green) and B(blue) are inputted from an external device 52 such as a personal computer to the color image forming apparatus 60. These color signals are converted into image data of C(cyanogen), M(Magenta), Y(yellow) and B(black) by a printer controller 53 within the apparatus. The image data are inputted to the scanning optical apparatuses 11, 12, 13 and 14, respectively. A plurality of light beams 41, 42, 43 and 44 which have been modulated in accordance with the image data are emitted from the scanning optical apparatuses, respectively, and then the photosensitive surfaces of the photosensitive drums 21, 22, 23 and 24 are scanned in the main scanning direction with the plurality of light beams.

In the color image forming apparatus of the present embodiment, the four scanning optical apparatuses 11, 12, 13 and 14 are arranged, and the image signals (image information) are recorded on the photosensitive surfaces of the photosensitive drums 21, 22, 23 and 24 which are arranged in parallel with the scanning optical apparatus 11, 12, 13 and 14, respectively, so as to correspond to C(cyanogen), M(Magenta), Y(yellow) and B(black) to print the color image at high speed.

In the color image forming apparatus of the present embodiment, as described above, the latent images of the four colors are formed on the photosensitive surfaces of the corresponding photosensitive drums 21, 22, 23 and 24 using a plurality of light beams based on the image data by the four scanning optical apparatuses 11, 12, 13 and 14. Thereafter, the latent images are transferred on a recording material in a multiplex manner to form one sheet of full color image.

As for the above-mentioned external device 52, for example, a color image reader including a CCD sensor may be used. In this case, a color digital copying machine is constituted by this color image reader and the color image forming apparatus 60.

In such a color image forming apparatus, the number of lines of used mesh dot pattern, and the screen angles are variegated. Then, in a part of the patterns, the irradiation position shift due to the surface tilt appears in the form of the Moiré pattern in the image to degrade remarkably the image quality. Consequently, a combination of the color image forming apparatus with the scanning optical apparatus of the present embodiment allows the high quality image containing less Moiré to be obtained.

As described above, in the present embodiment, it is possible to provide a tandem type color image forming apparatus in which the variation in the irradiation position due to the surface tilt exerts a large influence on an image, the apparatus being adapted to the high quality image recording and being capable of enhancing the function of correcting the surface tilt while meeting the curvature of field in the sub scanning cross section of a scanning optical apparatus by utilizing an easy and simple method and of suppressing the irradiation position shift due to the surface tilt of a deflecting surface to the less degree.

<Other Color Image Forming Apparatuses>

Figure 14:
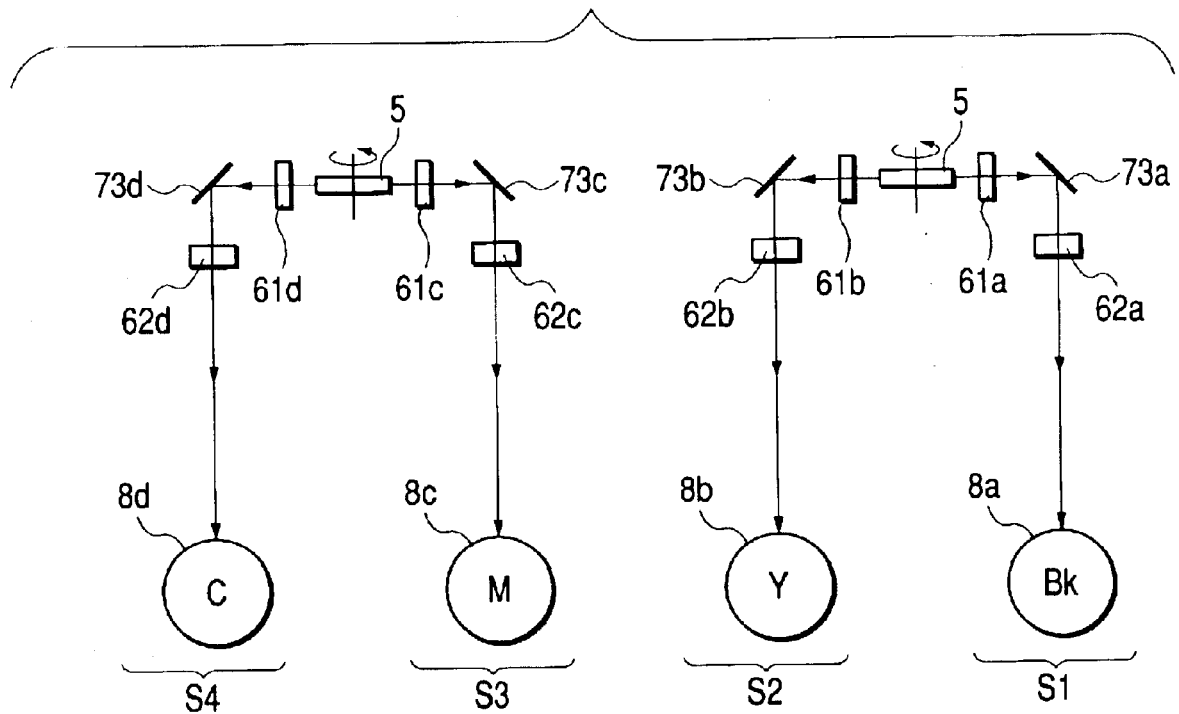
FIG. 14 is a schematic view showing construction of a main portion of a color image forming apparatus according to another embodiment of the present invention.
Figure 15:
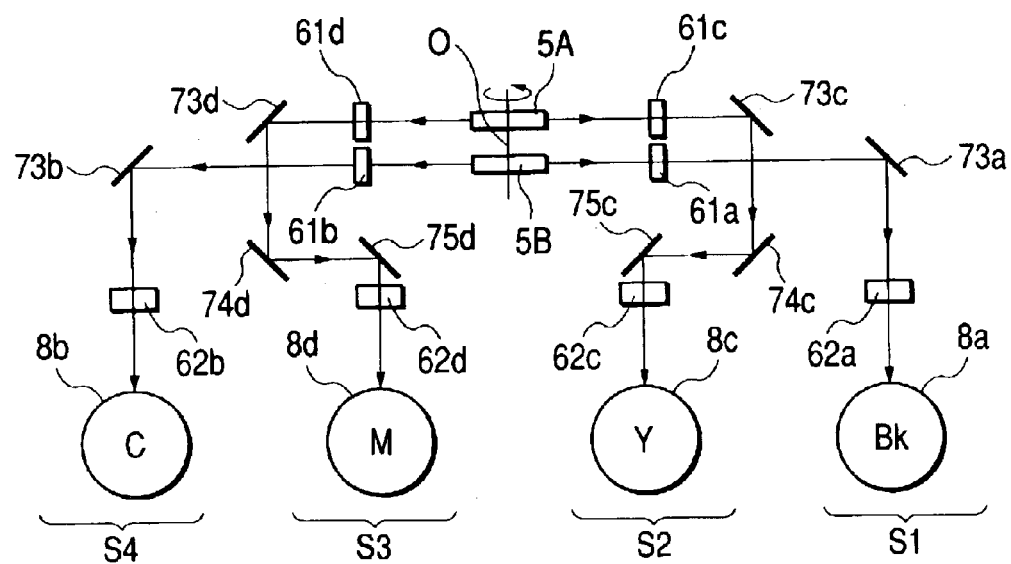
FIG. 15 is a schematic view showing construction of a main portion of a color image forming apparatus according to still another embodiment of the present invention.
Figure 16:
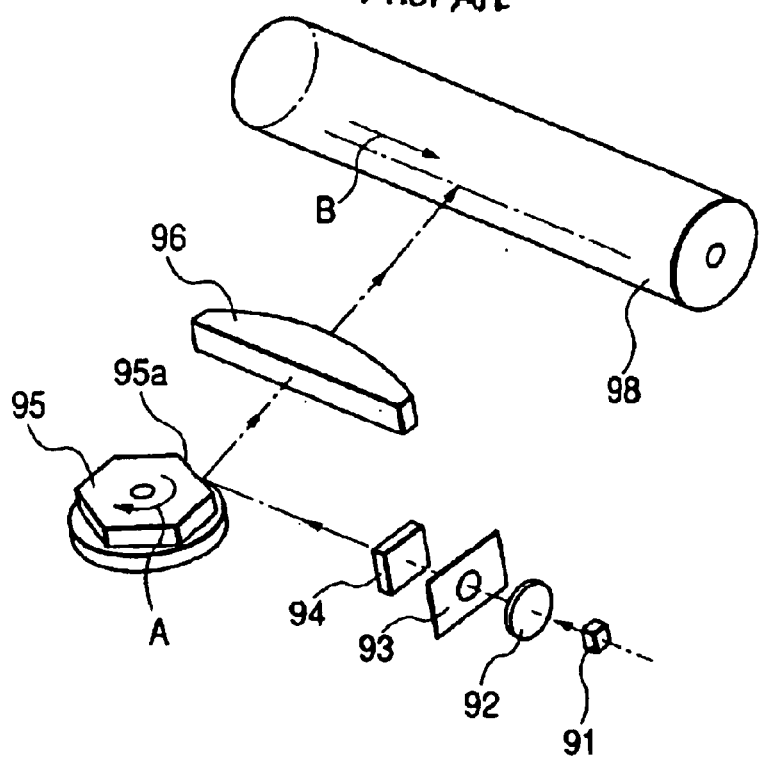
FIG. 16 is a perspective view showing construction of a main portion of a conventional scanning optical apparatus.
Figure 17:
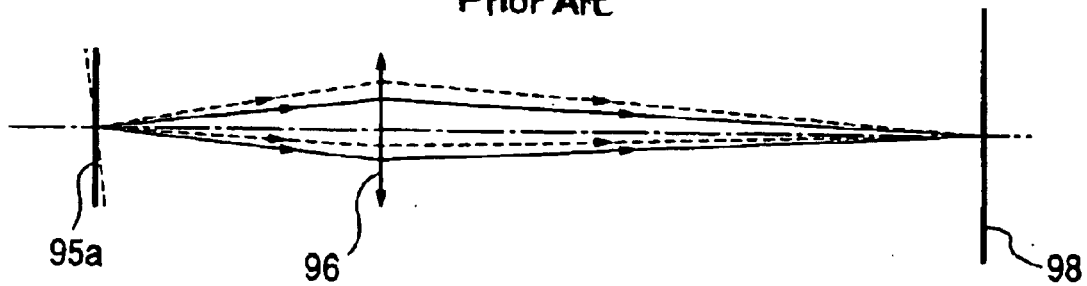
FIG. 17 is a view useful in explaining the principles of correction of surface tilt.
Figure 18:
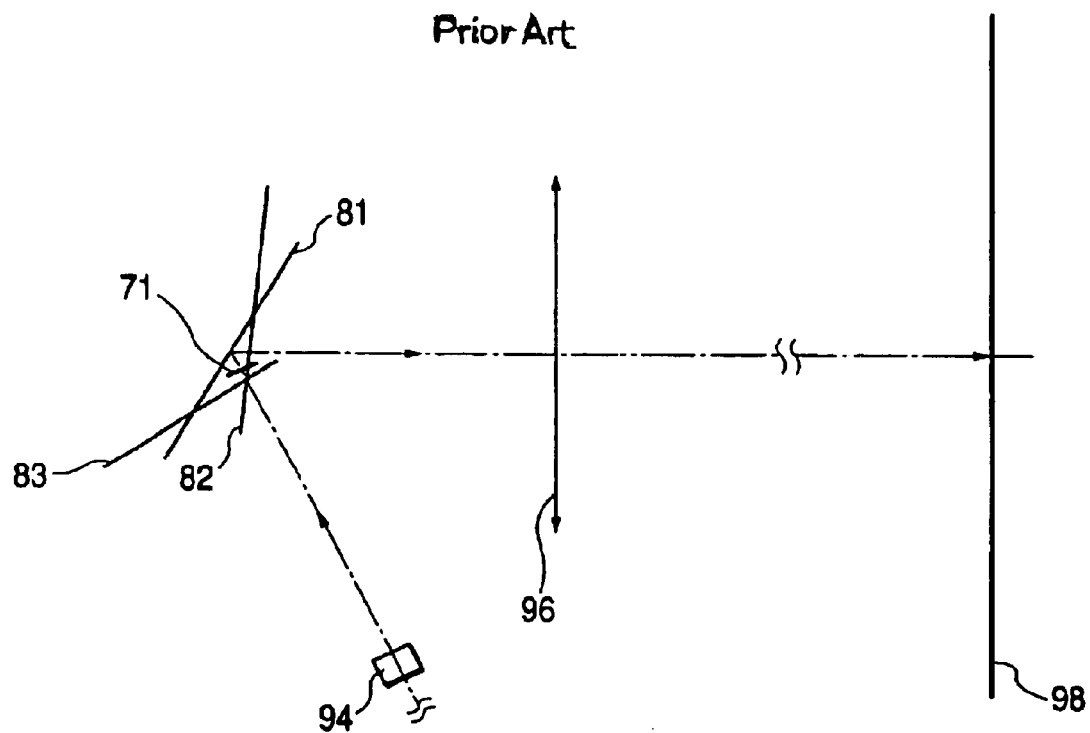
FIG. 18 is an enlarged view showing construction in the vicinity of a polygon mirror of a conventional scanning optical apparatus.

In this connection, the present invention is not intended to be limited to the tandem type color image forming apparatus shown in FIG. 13 of the present embodiment. That is to say, as shown in FIG. 14, for example, an image may also be formed using a plurality of light beams deflected by independent two optical deflectors by utilizing the scanning optical apparatus having any one of the constructions shown in the above-mentioned embodiments. Or, as shown in FIG. 15, two stages of optical deflectors may be provided within the sub-scanning cross section. In this case, an image may be formed using a plurality of light beams deflected by respective optical deflectors 5A and 5B by utilizing the scanning optical apparatus having any one of the constructions shown in the above-mentioned embodiments.

More specifically, FIG. 14 is a schematic view of a main portion of a color image forming apparatus. In this embodiment, a full color image is formed using a plurality of light beams deflected by two optical deflectors 5 and 5. In the figure, four luminous fluxes which have been reflected and deflected by polygon mirrors (optical deflectors) 5 and 5 to pass through first scanning lenses 61a, 61b, 61c and 61d are reflected downwardly by 90 degrees on the drawing by folding mirrors 73a, 73b, 73c and 73d to be introduced onto photosensitive surfaces of corresponding photosensitive drums 8a, 8b, 8c and 8d through second scanning lenses 62a, 62b, 62c and 62d, respectively. Thereby, the full color image is formed.

FIG. 15 is a schematic view of a main portion of another color image forming apparatus. In the present embodiment, a full color image is formed using a plurality of light beams deflected by the respective optical deflectors 5A and 5B. In the figure, after the light beams reflected and deflected (scanned) by the optical deflector 5A in the upper stage have passed through first scanning lenses 61c and 61d, they are folded with their optical paths by three sets of folding mirrors 73c, 74c and 74d, and 73d, and 74d and 75d to be introduced onto corresponding photosensitive drums 8c and 8d, respectively. After the light beams reflected and deflected (scanned) by the optical deflector 5B in the lower stage have passed through scanning lenses 61a and 61b, they are folded with their optical paths by a set of mirrors 73a and 73b to be introduced onto corresponding photosensitive drums 8a and 8b, respectively. Thereby, the full color image is formed.

As set forth hereinabove, according to the present invention, it is possible to attain a scanning optical apparatus adapted to high quality image recording and an image forming apparatus using the same, wherein the position where the wave aberration in a sub scanning cross section of luminous fluxes on an optical axis becomes least is located on the deflecting element side with respect to a surface to be scanned, whereby the function of correcting the surface tilt is enhanced while meeting the curvature of field in a sub scanning cross section, and the irradiation position shift due to the surface tilt of a deflecting surface is suppressed to the less degree by utilizing an easy and simple method.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is, therefore, to be determined solely by the appended claims.

What is claimed is:

1. A scanning optical apparatus including:
   a first optical element for converting a state of light beam emitted from light source means into another state;
   a second optical element for converting the light beam from the first optical element into a line image elongated in a main scanning direction;
   a deflecting element for deflecting and scanning the light beams from the second optical element; and
   a scanning optical element for forming an image of the light beam deflected by the deflecting element on a surface to be scanned with a spot-like shape, a deflecting surface of the deflecting element and the surface to be scanned being conjugate in a sub scanning cross section,
   wherein the position where the wave aberration in the sub scanning cross section of the light beam on an optical axis becomes least is located on the side of the deflecting element with respect to the surface to be scanned; and
   wherein when the distance from the surface to be scanned to the position where the wave aberration in the sub scanning cross section of the light beam on the optical axis becomes least is dS0, the distance from the deflection point of the light beam on the optical axis to the image formation position in the sub scanning cross section of the second optical element is HS0, and the lateral magnification in the sub scanning cross section of the scanning optical element is βs, the following condition is met:

$$HS0 \times \beta s^2 \leq dS0 < 0.1 HS0 \times \beta s^2.$$

2. A scanning optical apparatus according to claim 1, wherein the position where the wave aberration in the sub scanning cross section of the outermost off-axis light beam on the light source means side in the deflected light beam becomes least is located on the side opposite to the deflecting element side with respect to the surface to be scanned.

3. A scanning optical apparatus including:
   a first optical element for converting a state of light beam emitted from light source means into another state;
   a second optical element for converting the light beam from the first optical element into a line image elongated in a main scanning direction;
   a deflecting element for deflecting and scanning the light beams from the second optical element; and
   a scanning optical element for forming an image of the light beam deflected by the deflecting element on a surface to be scanned with a spot-like shape, a deflecting surface of the deflecting element and the surface to be scanned being conjugate in a sub scanning cross section,
   wherein the position where the wave aberration in the sub scanning cross section of the outermost off-axis light beam on the light source means side becomes least is located on the side opposite to the deflecting element side with respect to the surface to be scanned; and
   wherein when the distance from the surface to be scanned to the position where the wave aberration in the sub scanning cross section of the light beam on the optical axis becomes least is dS0, the distance from the deflection point of the light beam on the optical axis to the image formation position in the sub scanning cross section of the second optical element is HS0, and the lateral magnification in the sub scanning cross section of the scanning optical element is βs, the following condition is met:

$$HS0 \times \beta s^2 \leq dS0 < 0.1 HS0 \times \beta s^2.$$

4. A scanning optical apparatus according to claim 1 or 3, wherein when the lateral magnification in the sub scanning cross section of the scanning optical element is βs, the following condition is met:

$$1 \leq |\beta s| \leq 3.5.$$

5. A scanning optical apparatus according to claim 1 or 3, wherein the light source means has a single light emitting point.

6. A scanning optical apparatus according to claim 1 or 3, wherein the light source means has a plurality of light emitting points.

7. A scanning optical apparatus according to claim 1 or 3, wherein the scanning optical element includes a single optical element or a plurality of optical elements.

8. An image forming apparatus, comprising:
   the scanning optical apparatus according to claim 1 or 3;
   a photosensitive body arranged on the surface to be scanned;
   a developing unit for developing an electrostatic latent image formed on the photosensitive body with the light beam used for the scanning by the scanning optical apparatus in the form of a toner image;
   a transfer unit for transferring the toner image obtained through the developing to a material to which an image is to be transferred; and
   a fixing unit for fixing the transferred toner image to the material to which an image is to be transferred.

9. An image forming apparatus, comprising:
   the scanning optical apparatus according to claim 1 or 3; and
   a printer controller for converting code data inputted from an external device into image signals to input the resultant image signals to the scanning optical apparatus.

10. An image forming apparatus, comprising:
    a plurality of scanning optical apparatuses each including the scanning optical apparatus according to claim 1 or 3; and
    a plurality of image carriers arranged on the surfaces to be scanned of the scanning optical apparatuses, respectively, for forming images having respective colors different from one another.

11. An image forming apparatus according to claim 10, further comprising a printer controller for converting color signals inputted from an external device into image data having different colors to input the resultant image data to the scanning optical apparatuses, respectively.

* * * * *